United States Patent
Spalka et al.

(10) Patent No.: US 7,962,761 B1
(45) Date of Patent: Jun. 14, 2011

(54) COMPUTER IMPLEMENTED METHOD FOR GENERATING A PSEUDONYM, COMPUTER READABLE STORAGE MEDIUM AND COMPUTER SYSTEM

(75) Inventors: Adrian Spalka, Koblenz (DE); Jan Lenhardt, Bonn (DE)

(73) Assignee: CompuGroup Medical AG, Koblenz (DE)

( * ) Notice: Subject to any disclaimer, the term of this patent is extended or adjusted under 35 U.S.C. 154(b) by 0 days.

(21) Appl. No.: 12/690,278

(22) Filed: Jan. 20, 2010

(30) Foreign Application Priority Data

Dec. 18, 2009 (EP) .................................... 09179974

(51) Int. Cl.
*G06F 11/30* (2006.01)
*G06F 7/04* (2006.01)
*H04L 9/00* (2006.01)

(52) U.S. Cl. .......... 713/189; 713/187; 713/188; 726/27; 726/28; 726/29; 726/30

(58) Field of Classification Search .................... 713/189
See application file for complete search history.

(56) References Cited

U.S. PATENT DOCUMENTS

| 2005/0157880 A1* | 7/2005 | Kurn et al. ................ 380/279 |
| 2006/0106805 A1 | 5/2006 | Aaron |
| 2008/0154782 A1* | 6/2008 | Kang et al. .................. 705/74 |

FOREIGN PATENT DOCUMENTS

WO  WO9933222 A1  7/1999

OTHER PUBLICATIONS

Yang Zhang: "An Efficient Anonymous Authentication Protocol with Pseudonym Revocability", Inc, IMS and IDC, 2009 Fifth International Joint Conference On, IEEE, Piscataway, NJ, USA, Aug. 25, 2009, pp. 1929-1934, XP031564722, ISBN: 978-0-7695-3769-6.

* cited by examiner

*Primary Examiner* — Longbit Chai
(74) *Attorney, Agent, or Firm* — Hulsey, P.C.; William N. Hulsey, III; Loren T. Smith

(57) ABSTRACT

The invention relates to a computer implemented method for generating a pseudonym for a user comprising entering a user-selected secret, storing the user-selected secret in memory, computing a private key by applying an embedding and randomizing function onto the secret, storing the private key in the memory, computing a public key using the private key, the public key and the private key forming an asymmetric cryptographic key, erasing the secret and the private key from the memory, and outputting the public key for providing the pseudonym.

20 Claims, 4 Drawing Sheets

COMPUTER IMPLEMENTED METHOD FOR GENERATING A PSEUDONYM, COMPUTER READABLE STORAGE MEDIUM AND COMPUTER SYSTEM

CROSS REFERENCE TO RELATED APPLICATIONS

This application claims the priority of European Patent Application #EP091179974, entitled "A COMPUTER IMPLEMENTED METHOD FOR GENERATING A PSEUDONYM, COMPUTER READABLE STORAGE MEDIUM AND COMPUTER SYSTEM" filed on Dec. 18, 2009.

FIELD OF THE INVENTION

The present invention relates to the field of computer implemented pseudonym generators.

BACKGROUND

Various computer implemented schemes for providing a pseudonym for a user are as such known. A pseudonym is typically used for protecting the informational privacy of a user such as in a social network. Such computer implemented schemes for providing a pseudonym typically enable the disclosure of identities of anonymous users if an authority requests it, if certain conditions are fulfilled. For example, Benjumea et al, Internet Research, Volume 16, No. 2, 2006 pages 120-139 devise a cryptographic protocol for anonymously accessing services offered on the web whereby such anonymous accesses can be disclosed or traced under certain conditions.

SUMMARY

The invention provides a computer implemented method for generating a pseudonym for a user comprising: entering a user-selected secret, storing the user-selected secret in memory, computing a private key by applying an embedding and randomizing function onto the secret, storing the private key in the memory, computing a public key using the private key, the public key and the private key forming an asymmetric cryptographic key, erasing the secret and the private key from the memory, outputting the public key for providing the pseudonym.

The term 'user-selected secret' is understood herein as any secret data that is selected by or related to a user, such as a user-selected secret password or a secret key, such as a symmetric cryptographic key. Further, the term 'user-selected secret' does also encompass a combination of biometric data obtained from the user and a user-selected password or secret key, such as a biometric hash value of the password or secret key.

The term 'memory' as used herein encompasses any volatile or non-volatile electronic memory component or a plurality of electronic memory components, such as a random access memory.

The term 'embedding function' or 'embedding component' as used herein encompasses any injective function that maps the elements of an n-dimensional space onto elements of an m-dimensional space, where n>m. For the purpose of this invention, we focus on embedding functions where m=1. In accordance with embodiments of this invention n is equal to 2 and m is equal to 1 for combining two elements onto a single element. In one embodiment, a user-selected secret and a public parameter are mapped by the embedding function to the 1-dimensional space to provide a combination of the user selected secret and a public parameter, e.g. a single number that embeds the user selected secret. This single number constitutes the embedded secret. In another embodiment, a first hash value of the user selected secret and a random number are mapped by the embedding function to the 1-dimensional space to provide the embedded secret.

A 'randomizing function' or 'randomizing component' as understood herein encompasses any injective function that provides an output of data values that are located within a predefined interval and wherein the distribution of the data values within the predefined interval is a substantially uniform distribution.

The term 'embedding and randomizing function' as used herein encompasses any function that implements both an embedding function and a randomizing function.

Embodiments of the present invention are particularly advantageous as an extremely high degree of protection of the informational privacy of users is provided. This is due to the fact that an assignment of the user's identity to the user's pseudonym does not need to be stored and that no third party is required for establishing a binding between the pseudonym and the user's identity. In contrast, embodiments of the present invention enable to generate a user's pseudonym in response to the user's entry of a user-selected secret whereby the pseudonym is derived from the user-selected secret. As the user-selected secret is only known by the user and not stored on any computer system there is no way that a third party could break the informational privacy of the user, even if the computer system would be confiscated such as by a government authority.

This enables to store sensitive user data, such as medical data, in an unencrypted form in a publicly accessible database. The user's pseudonym can be used as a database access key, e.g. a primary key or candidate key value that uniquely identifies tuples in a database relation, for read and write access to data objects stored in the database.

For example, the database with pseudonymous data can be used for a decision support system, e.g. in the medical field for evaluating a user's individual medical data and processing the data by rules. The result of the evaluation and processing by rules may be hints and recommendations to the physician regarding the user's health condition and further treatment.

In accordance with an embodiment of the invention, at least one public parameter is used for applying the embedding and randomization function. A public parameter may be the name of the user, an email address of the user or another identifier of the user that is publicly known or accessible. A combination of the user-selected secret and the public parameter is generated by the embedding component of the embedding and randomization function that is applied on the user-selected secret and the public parameter.

The combination can be generated such as by concatenating the user-selected secret and the public parameter or by performing a bitwise XOR operation on the user-selected secret and the public parameter. This is particularly advantageous as two users may by chance select the same secret and still obtain different pseudonyms as the combinations of the user-selected secrets with the user-specific public parameters differ.

In accordance with an embodiment of the invention, the embedding component of the embedding and randomizing function comprises a binary cantor pairing function. The user-selected secret and the public parameter are embedded by applying the binary cantor pairing function on them.

In accordance with an embodiment of the invention, the randomizing component of the embedding and randomizing function uses a symmetric cryptographic algorithm like the Advanced Encryption Standard (AES) or the Data Encryption Standard (DES) by means of a symmetric key. This can be performed by encrypting the output of the embedding component of the embedding and randomizing function, e.g. the binary cantor pairing function, using AES or DES.

In accordance with an embodiment of the invention, the symmetric key that is used for randomization by means of a symmetric cryptographic algorithm is user-specific. If the symmetric key is user-specific, the use of a public parameter can be skipped, as well as embedding the user-selected secret and the public parameter; the randomizing function can be applied then solely on the user-selected secret. By applying a symmetric cryptographic algorithm onto the user-selected secret using a user-specific symmetric key both embedding and randomization of the user-selected secret are accomplished. If the symmetric key is not user-specific, the use of the public parameter and embedding the user-selected secret and the public parameter are necessary.

In accordance with an embodiment of the invention, the embedding and randomizing function is implemented by performing the steps of applying a first one-way function on the user-selected secret to provide a first value, providing a random number, embedding the random number and the first value to provide a combination, and applying a second one-way function on the combination to provide a second value, wherein the second value constitutes the private key. This embodiment is particularly advantageous as it provides a computationally efficient method of implementing an embedding and randomization function.

In accordance with an embodiment of the invention, the computation of the public key is performed by elliptic curve cryptography (ECC). The private key that is output by the embedding and randomizing function is multiplied with a first base point given by the domain parameters of the elliptic curve to provide another point on the elliptic curve, which is the pseudonym.

In accordance with an embodiment of the invention, it is determined whether the output of the embedding and randomizing function fulfils a given criterion. For example, it is checked whether the output of the embedding and randomization function is within the interval between 2 and n−1, where n is the order of the elliptic curve. If the output of the embedding and randomizing function does not fulfil this criterion another random number is generated and the embedding and randomization function is applied again to provide another output which is again checked against this criterion. This process is performed repeatedly until the embedding and randomizing function provides an output that fulfils the criterion. This output is then regarded as the private key that is used to calculate the public key, i.e. the pseudonym, by multiplying the private key with the first base point.

In accordance with a further embodiment of the invention the base point is varied leaving the other domain parameters unchanged for computation of multiple pseudonyms for a given user. This provides a computationally efficient way to compute multiple pseudonyms for a given user in a secure way.

In another aspect the present invention relates to a computer readable storage medium having stored therein instructions, which when executed by a computer system, cause the computer system to generate a pseudonym for a user upon a user's entry of a user-selected secret by performing the steps of storing the user-selected secret in memory, computing a private key by applying an embedding and randomizing function onto the secret, storing the private key in memory, computing a public key using the private key, the public key and the private key forming an asymmetric cryptographic key pair, erasing the secret and the private key from memory, outputting the public key for providing the pseudonym.

In another aspect the present invention relates to a computer system comprising means for entering a user-selected secret, memory means for storing the user-selected secret and a private key, processor means being operable to compute the private key by applying an embedding and randomizing function onto the secret, compute a public key using the private key, the public key and the private key forming an asymmetric cryptographic key pair, erase the secret and the private key as well as any intermediate computational results from memory, and output the public key for providing the pseudonym.

BRIEF DESCRIPTION OF THE DRAWINGS

In the following embodiments of the invention are explained in greater detail, by way of example only, making reference to the drawings in which.

DETAILED DESCRIPTION

Figure 1:
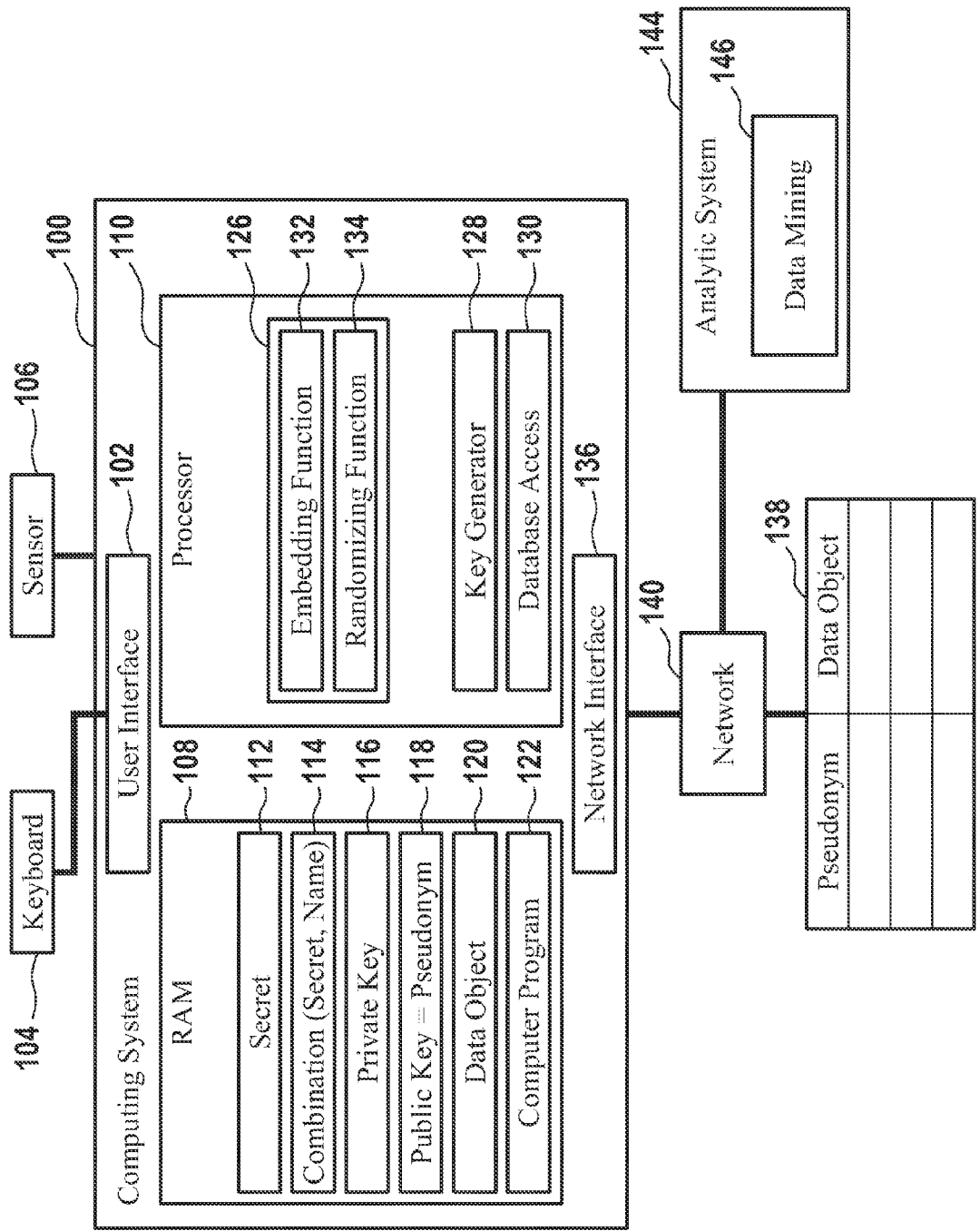
FIG. 1 is a block diagram of a first embodiment of a computer system of the invention.

Throughout the following detailed description like elements of the various embodiments are designated by identical reference numerals.

FIG. 1 shows a computer system 100 that has a user interface 102 for a user's entry of a user-selected secret that is designated as $s_T$ in the following. For example, a keyboard 104 may be coupled to the computer system 100 for entry of $s_T$. Instead of a keyboard 104 a touch panel or another input device can be coupled to the computer system 100 for entry of $s_T$. In addition, a sensor 106 can be coupled to the computer system 100 such as for capturing biometric data from a biometric feature of the user. For example, the sensor 106 may be implemented as a fingerprint sensor in order to provide biometric fingerprint data to the computer system 100.

A public parameter, such as the user's name or email address, can also be entered into the computer system 100 via the keyboard 104 or otherwise. For example, a personal set $V_{T,i}$ containing at least one user-specific public parameter, such as the user's name or email address, is entered into the computer system 100 by the user $T_i$.

The computer system 100 has a memory 108, such as a random access memory, and at least one processor 110. The memory 108 serves for temporary storage of the user-selected secret $s_T$ 112, a combination 114 of $s_T$ 112 and $V_{T,i}$, a private key 116, a public key 118 that constitutes a pseudonym of the user $T_i$, and a data object 120, such as a medical data object containing medical data related to the user $T_i$. Further, the memory 108 serves for loading computer program instructions 122 for execution by the processor 110.

The computer program instructions 122 provide an embedding and randomizing function 126, a key generator 128 and may also provide a database access function 130 when executed by the processor 110.

The embedding and randomizing function 126 may be provided as a single program module or it may be implemented by a separate embedding function 132 and a separate randomizing function 134. For example, the embedding function 132 or an embedding component of the embedding and randomization function 126 provides the combination 114 by concatenating $s_T$ and the user's name or by performing a bitwise XOR operation on $s_T$ and the user's name.

In one implementation, the embedding and randomizing function 126 implements symmetric encryption provided by a symmetric cryptographic algorithm, e.g. AES, using a user-specific symmetric key for encryption of the user-selected secret 112. This provides both embedding and randomizing of $s_T$ 112.

In another implementation, the embedding function 132 is implemented by a binary cantor pairing function for embedding $s_T$ 112 and $V_{T,i}$, and the randomizing function 134 is implemented by AES encryption using a symmetric key that is the same for the entire set of users T.

Figure 3:
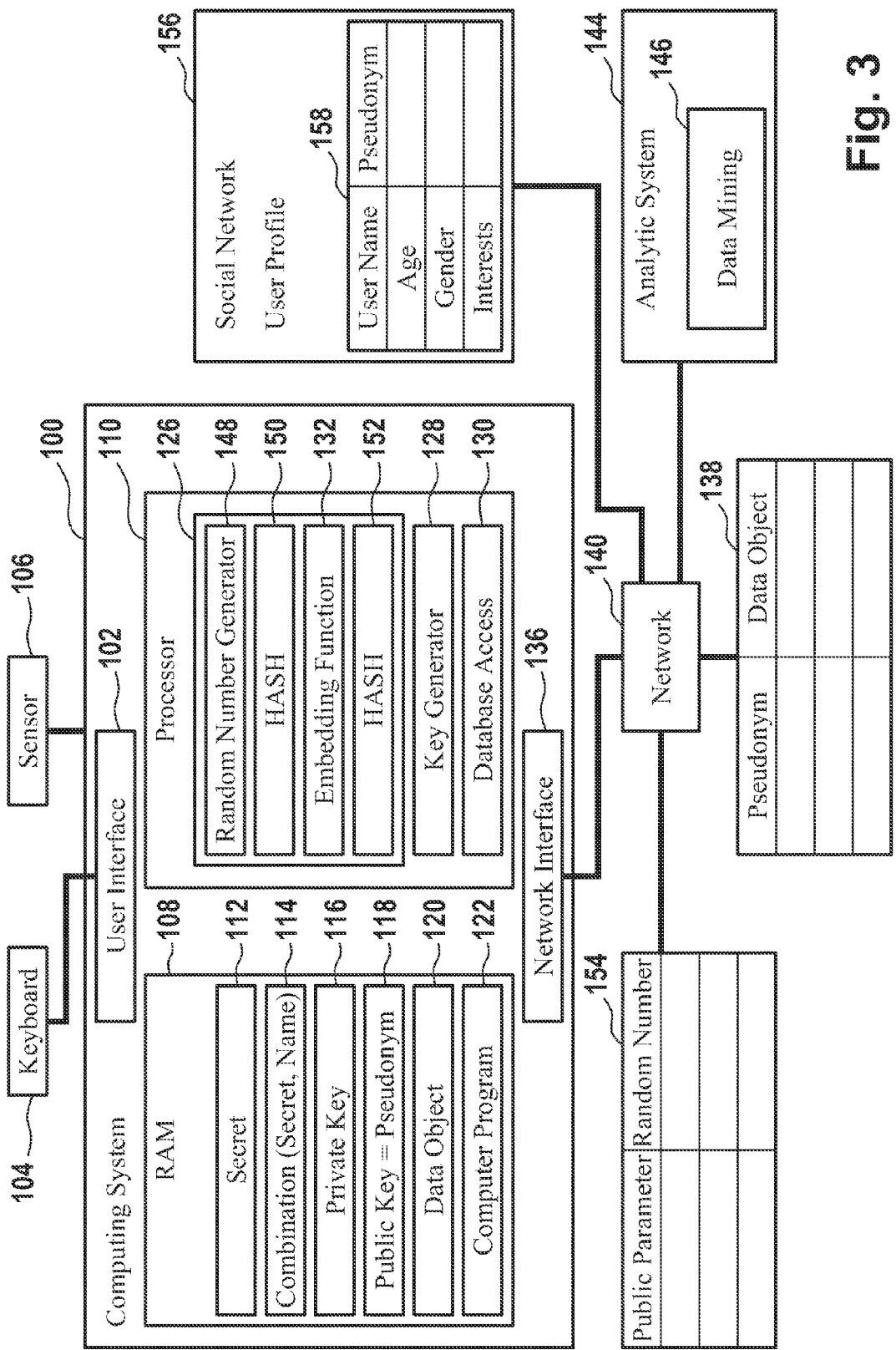
FIG. 3 is a block diagram of a further embodiment of a computer system of the invention.
Figure 4:
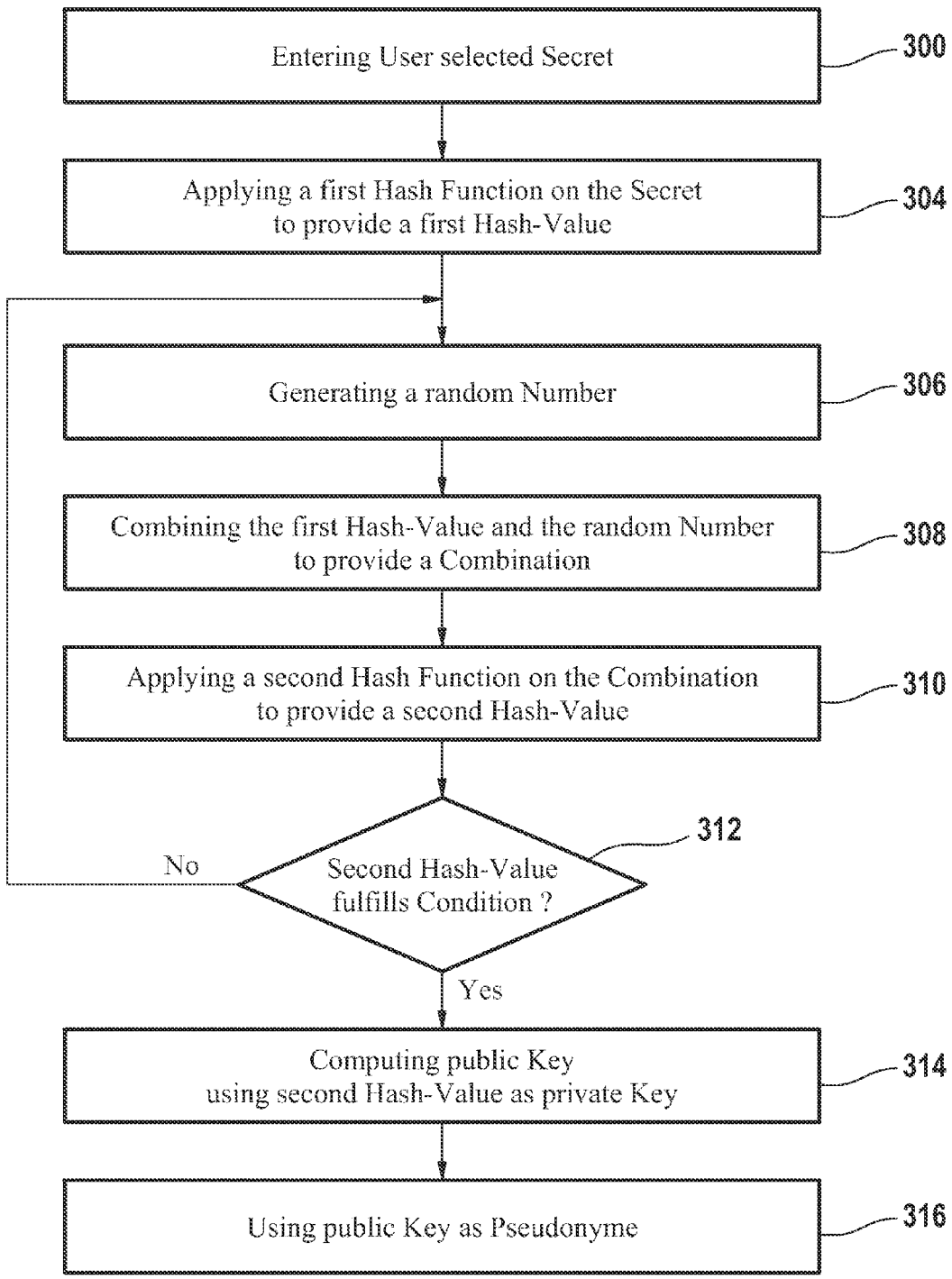
FIG. 4 is a flowchart being illustrative of a further embodiment of a method of the invention.

In still another embodiment the embedding and randomizing function 126 is implemented by two different hash functions and a random number generator (cf. the embodiment of FIGS. 3 and 4).

The key generator 128 serves to compute public key 118 using elliptic curve cryptography (ECC). The private key 116 is multiplied by a base point given by the domain parameters of the elliptic curve which provides the public key 118. By varying the base point and leaving the other domain parameters of the elliptic curve unchanged multiple pseudonyms can be computed for the user $T_i$ on the basis of the same secret $s_T$.

The computer system 100 may have a network interface 136 for coupling the computer system 100 to a database 138 via a communication network 140, such as the Internet. The database access function 130 enables to perform a write and a read access for accessing the data object 120 stored in the database 138 using the public key 118, i.e. the user's pseudonym, as a database access key, e.g. a primary key or candidate key value that uniquely identifies tuples in a database relation.

Further, an analytic system 140, such as a decision support system (DSS) can be coupled to the database 138 such as via the network 140. The analytic system 144 comprises a component 146 for analyzing the data objects of the users T which are stored in the database 138, such as by data mining or data clustering.

In one application the data objects stored in the database 138 contain medical data of the various users. By analyzing the various data objects using techniques such as data mining and/or data clustering techniques medical knowledge can be obtained. For example, data clustering may reveal that certain user attributes contained in the medical data increase the risk for certain diseases.

For generating a pseudonym $p_{T,i}$ for a user $T_i$ based on the secret $s_T$ 112 and domain parameters $D_i$ containing a base point for the elliptic curve cryptography the following steps are executed by the computer system 100 in operation:

The user $T_i$ enters his or her user-selected secret $s_T$ 112 such as via the keyboard 104. In addition, the user may enter at least one public parameter $V_{T,i}$ such as his name or email address via the keyboard 104 or otherwise. Such a public parameter $V_{T,i}$ may also be permanently stored in the computer system 100.

The secret $s_T$ 112 is temporarily stored in memory 108. Upon entry of the secret $s_T$ 112 the embedding function 132 or the embedding component of the embedding and randomizing function 126 generates the combination 114 of the secret $s_T$ 112 and the public parameter $V_{T,i}$. The resultant combination 114 is temporarily stored in the memory 108.

Next, the randomizing function 134 or the randomizing component of the embedding and randomizing function 126 is invoked in order to calculate the private key 116 on the basis of the combination 114. The resultant private key 116 is temporarily stored in memory 108. In the next step, the key generator 128 is started for computing the public key 118 by multiplying the private key 116 by the base point contained in the domain parameters $D_i$ of the elliptic curve being used.

The public key 118, i.e. the pseudonym $p_{T,i}$, is stored in memory 108. The secret $s_T$ 112, the combination 114 as well as the private key 116 as well as any intermediate result obtained by execution of the embedding and randomizing function 126 and the key generator 128 are then erased from the memory 108 and/or the processor 110. As a consequence, there is no technical means to reconstruct the assignment of the resultant pseudonym to the user $T_i$ as only the user knows the secret $s_T$ 112 that has led to the generation of his or her pseudonym $p_{T,i}$. A data object 120 containing sensitive data of the user $T_i$, such as medical data, can then be stored by execution of the database access function 130 in the pseudomized database 138 using the pseudonym $p_{T,i}$ as a database access key, e.g. a primary key or candidate key value that uniquely identifies tuples in a database relation.

The user-selected secret $s_T$ 112 may be obtained by combining a user-selected password or secret key with biometric data of the user $T_i$ that is captured by the sensor 106. For example, a hash value of the user-selected password or secret key is calculated by execution of respective program instructions by the processor 110. In this instance the hash value provides the user-selected secret $s_T$ 112 on which the following calculations are based.

A plurality of users from the public set of enrolled participants T may use the computer system 100 to generate respective pseudonyms $p_{T,i}$ and to store data objects containing sensitive data, such as medical information in the database 138 as it has been described above in detail for one of the users $T_i$ by way of example.

For reading the data object of one of the users $T_i$ from the database 138 the user has to enter the secret $s_T$ 112. Alternatively, the user has to enter the user-selected password or secret key via the keyboard 104 and an acquisition of the biometric data is performed using the sensor for computation of a hash value that constitutes $s_T$ 112. As a further alternative, the secret key is read by the computer system from an integrated circuit chip card of the user. On the basis of $s_T$ 112 the pseudonym can be computed by the computer system 100.

The pseudonym is then used for performing a database read access on the database 138 in order to read one or more data objects 120 that are stored in the database 138 for that user $T_i$. After the database access operation has been performed the secret $s_T$ 112, the combination 114, the private key 116 and the public key 118 are erased from the computer system 100 as well as any intermediate computational results.

Figure 2:
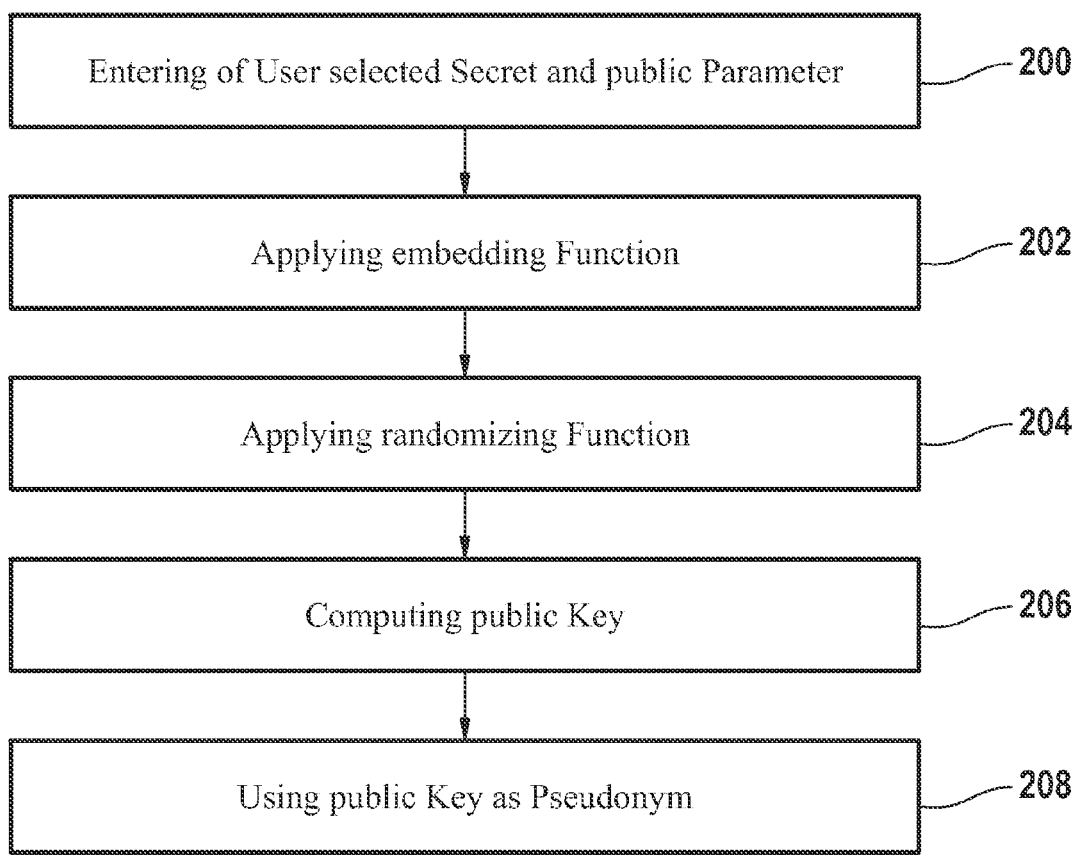
FIG. 2 is a flowchart being illustrative of an embodiment of a method of the invention.

FIG. 2 shows a corresponding flowchart.

In step 200 the user $T_i$ enters his or her user-selected secret $s_T$ and public parameter $V_{T,i}$. In step 202 $s_T$ and $V_{T,i}$ are combined to provide the first combination by the embedding function (cf. embedding function 132 of FIG. 1). Next, the randomizing function (cf. randomizing function 134 of FIG. 1). is applied on $s_T$ and $V_{T,i}$ in step 204 which provides a private key. As an alternative, an embedding and randomizing function is applied on $s_T$ and $V_{T,i}$ which provides the private key.

In step 206 a public key is computed using the private key obtained in step 204 and the public key is used in step 208 as a pseudonym of the user $T_i$. For example the pseudonym may be used as a database access key, e.g. a primary key or candidate key value that uniquely identifies tuples in a database relation for storing a data object for the user $T_i$ in a database with pseudonymous data (cf. database 138 of FIG. 1).

FIG. 3 shows a further embodiment of computer system 100. In the embodiment considered here the embedding and randomizing function 126 comprises an embedding function 132, a random number generator 148, a first hash function 150 and a second hash function 152. In the embodiment considered here the computation of the private key 116 based on $s_T$ 112 may be performed as follows:

The first hash function 150 is applied on the user-selected secret $s_T$ 112. This provides a first hash value. Next, a random number is provided by the random number generator 148. The random number and the first hash value are combined by the embedding function 132 to provide the combination, i.e. the embedded secret $s_T$ 112.

The combination of the first hash value and the random number can be obtained by concatenating the first hash value and the random number or by performing a bitwise XOR operation on the first hash value and the random number by the embedding function 132. The result is a combination on which the second hash function 152 is applied to provide a second hash value. The second hash value is the private key 116 on which the calculation of the public key 118 is based.

Dependent on the implementation it may be necessary to determine whether the second hash value fulfils one or more predefined conditions. Only if such conditions are fulfilled by the second hash value it is possible to use the second hash value as the private key 116 for the following computations. If the second hash value does not fulfill one or more of the predefined conditions a new random number is provided by the random number generator 148 on the basis of which a new second hash value is computed which is again checked against the one or more predefined conditions (cf. the embodiment of FIG. 4).

The random number on the basis of which the private key 116 and thereafter the public key 118 has been computed is stored in a database 154 that is coupled to the computer system 100 via the network 140. The random number may be stored in the database 154 using the public parameter $V_{T,i}$ as the database access key for retrieving the random number for reconstructing the pseudonym at a later point of time.

The user $T_i$ may use the pseudonym provided by the computer system 100 for his or her registration in an anonymous online community 156 e.g. a social network. For registration the user $T_i$ creates his or her user profile 158 by entering the pseudonym 118 as the username such that the various private data entered into the user profile 158 remain private even though they are published in the online community 156 due to the fact that the assignment of the pseudonym to the user $T_i$ is stored nowhere and cannot be reconstructed by technical means without knowledge of the user-selected secret $s_T$ 112.

For reconstructing the pseudonym the user has to enter his or her user-selected secret $s_T$ 112 into the computer system on the basis of which the first hash value is generated by the hash function 150 and the combination 114 is generated by the embedding function 132 or the embedding component of the embedding and randomizing function 126 using the first hash value and the random number retrieved from the database 154.

Depending on the implementation, the user may also need to enter the user's public parameter $V_{T,i}$. A database access is performed using the user's public parameter $V_T$,i as a database access key, e.g. a primary key or candidate key value that uniquely identifies tuples in a database relation, in order to retrieve the random number stored in the database 154.

In other words, the reconstruction of the private key 116 is performed by applying the embedding function 132 on the first hash value obtained from the user-selected secret $s_T$ 112 and the retrieved random number which yields the combination 114. The first hash value is combined with the random number retrieved from the database 154 by the embedding function 132 to provide the combination onto which the second hash function 152 is applied which returns the private key 116, out of which the public key 118, i.e. the pseudonym, can be computed. After the user $T_i$ has recovered his or her pseudonym a database access for reading and/or writing from or to the database 138 may be performed or the user may log into the online community 156 using his or her pseudonym for anonymous participation in the online community 156.

FIG. 4 shows a respective flowchart for generating a pseudonym $p_{T,i}$ for user $T_i$. In step 300 the user enters the user-selected secret $s_T$. In step 304 a first hash function is applied on the user-selected secret $s_T$ which provides a first hash value. In step 306 a random number is generated and in step 308 an embedding function is applied on the first hash value and the random number to provide a combination of the first hash value and the random number. In other words, the first hash value and the random number are mapped to a 1-dimensional space, e.g. a single number, by the embedding function. The combination can be obtained by concatenating the random number and the first hash value or by performing a bitwise XOR operation on the first hash value and the random number.

In step 310 a second hash function is applied on the combination which provides a second hash value. The second hash value is a candidate for the private key. Depending on the implementation the second hash value may only be usable as a private key if it fulfils one or more predefined conditions. For example, if ECC is used, it is checked whether the second hash value is within the interval between 2 and n−1, where n is the order of the elliptic curve.

Fulfillment of such a predefined condition is checked in step 312. If the condition is not fulfilled, the control returns to step 306. If the condition is fulfilled, then the second hash value qualifies to be used as a private key in step 314 to compute a respective public key providing an asymmetric cryptographic key-pair consisting of the private key and the public key. In step 316 the public key computed in step 314 is used as a pseudonym such as for accessing a pseudomized database, participation in an anonymous online community or other purposes.

Mathematical Appendix
1. Embedding Functions
There exist n-ary scalar functions $$d_i N \times N = N_d$$

which are injective—and even bijective, where N is the set of natural numbers. The function d( ) embeds uniquely an n-dimensional space, i.e. n-tuples $(k_1, \ldots, k_n)$, into scalars, i.e. natural numbers k.

2. The Binary Cantor Pairing Function
The binary cantor pairing function is an embodiment of embedding function 132. The binary cantor pairing function is defined as follows:

$$\pi_1 N \times N \to N$$

$$\pi(m, n,) = \frac{1}{2}(m+n)(m+n+1) + n$$

which assigns to each fraction $$\frac{m}{n}$$

the unique natural number π(m, n)—thus demonstrating that there are no more fractions than integers. Hence, if we map both $s_T$ and $V_{T,i}$ to natural numbers and use the fact that all identities are distinct then $\pi(s_T, V_{T,i})$ yields a unique value for each identity, even if there are equal personal secrets. To be more precise, since this function does not distinguish between e.g.

$$\frac{1}{2}, \frac{2}{4}$$

etc, it assigns to each fraction an infinite number of unique natural numbers.

3. Elliptic Curve Cryptography (ECC)

Let:
p be a prime number, p>3, and $\mathbb{F}_p$ the corresponding finite field
a and b integers
Then the set E of points (x, y) such that $$E=\{(x, y) \in \mathbb{F}_p \times \mathbb{F}_p | y^2 = x^3 + ax + b\} \quad (F1)$$

defines an elliptic curve in $\mathbb{F}_p$. (For reasons of simplicity, we skip the details on E being non-singular and, as well, we do not consider the formulae of elliptic curves over finite fields with p=2 and p=3. The subsequent statements apply to these curves, too.)

The number m of points on E is its order.

Let P,Q ∈ E be two points on E. Then the addition of points $$P+Q=R \text{ and } R \in E \quad (F2)$$

can be defined in such a way that E forms an Abelian group, viz, it satisfies the rules of ordinary addition of integers. By writing $$P+P=[2]P$$

We define the k-times addition of P as [k]P, the point multiplication.

Now EC-DLP, the elliptic curve discretionary logarithm problem, states that if $$Q=[k]P \quad (F3)$$

then with suitably chosen a, b, p and P, which are known to public, and the as well known to the public point Q it is computationally infeasible to determine the integer k.

The order n of a point P is the order of the subgroup generated by P, i.e. the number of elements in the set $$\{P, [2]P, \ldots, [n]P\} \quad (F4)$$

With all this in mind we define an elliptic curve cryptographic (ECC) system as follows. Let:
E be an elliptic curve of order m
B ∈ E a point of E of order n, the base point
Then $$D=\{a, b, p, B, n, co(B)\} \quad (F5)$$

with $$co(B) = \frac{m}{n}$$

defines a set of domain ECC-parameters. Let now g be an integer and $$Q=[g]B \quad (F6)$$

Then (g, Q) is an ECC-key-pair with g being the private key and Q the public key.

For we rely on findings of Technical Guideline TR-03111, Version 1.11, issued by the Bundesamt für Sicherheit in der Informationstechnik (BSI), one of the best accredited source for cryptographically strong elliptic curves, we can take that m=n, i.e. co(B)=1, and hence reduce (F5) to $$D=\{a, b, p, B, n\} \quad (F7)$$

Now we can define our one-way function. Let D be a set of domain parameters concordant with (F7). Then $$f:[2, n-1] \to E$$
$$k \mapsto [k]B \quad (F8)$$

i.e. the point multiplication (F6), is an injective one-way function.

4. Implementing Key Generator Based on ECC

The key generator 128 (cf. FIGS. 1 and 3) can be implemented using ECC.

Definitions:
There are public sets of ECC-domain parameters $D_1$, $D_2$, ... concordant with (F7)

$$D_i=\{a_i, b_i, p_i, B_i, n_i\} \quad (F9)$$

There are public functions: an embedding function d( ), a randomising function r( ) and our one-way function f( )defined by (F8).

There is a public set of enrolled participants (users)

$$T=\{T_1, T_2, \ldots\} \quad (F10)$$

Note that a $T_i$ does not necessarily possess any personally identifying details, i.e. we assume that T resembles the list of participants in an anonymous Internet-community, in which each participant can select his name at his discretion as long as it is unique.

Each participant T ∈ T chooses at his complete discretion his personal secret $s_T$. In particular, for this secret is never revealed to anybody else—it is the participant's responsibility to ensure this—it is not subject to any mandatory conditions, such as uniqueness.

Our pseudonym derivation function is $$h(\ )=f(r(d(\ ))) \quad (F11)$$

with the following properties:
Given a T ∈ T with his $s_T$, a $D_i$ and T, $D_i \in V_{T,i}$ $$r(d(s_T, V_{T,i}))=g_{T,i} \quad (F12)$$

where $g_{T,i}$ is a unique and strong, i.e. sufficiently random, private ECC-key for $D_i$.
The pseudonym $p_{T,i}$ corresponding to T, $s_T$ and $D_i$ is $$p_{T,i}=f(g_{T,i}, D_i)=[g_{T,i}]B_i=(x_{T,i}, y_{T,i}) \quad (F13)$$

There is a public set of pseudonyms $$P=\{p_1, p_2, \ldots\} \quad (F14)$$

such that P comprises one or more pseudonyms for each participant in T computed according to (F11). This wording implies that here is no recorded correspondence between a participant in T and his pseudonyms in P, i.e. each $p_{T,i}$ is inserted in an anonymous way as $p_k$ into P.

Remarks:

The use of multiple domain parameters enables us to endow a single participant with a single personal secret with multiple pseudonyms. This in turn enables a participant to be a member of multiple pseudonymous groups such that data of these groups cannot—for, e.g. personal or legal reasons—be correlated. Therefore, attempts to exploit combined pseudonymous profiles for unintended, possibly malicious purposes, are of no avail.

The distinction between two sets of domain parameters $D_i$ and $D_j$ can be minor. In accordance with our principle to use only accredited domain parameters, e.g. those listed in BSI TR-03111, we can set $$D_i = \{a, b, p, B, n\} \quad (F15)$$

by swapping B for a statistically independent $B_2$, i.e. by choosing a different base point, we can set $$D_j = \{a, b, p, B_2, n\} \quad (F16)$$

For $D_i$ and $D_j$ refer to the same elliptic curve we can have only one function (F12) and introduce the crucial distinction with (F13). This vastly simplifies concrete implementations—we select a suitable curve and vary the base points only.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

| List of Reference Numerals | |
|---|---|
| 100 | Computer system |
| 102 | User interface |
| 104 | Keyboard |
| 106 | Sensor |
| 108 | Memory |
| 110 | Processor |
| 112 | A user-selected secret |
| 114 | Combination |
| 116 | Private key |
| 118 | Public key |
| 120 | Data object |
| 122 | Computer program instructions |
| 124 | Combination generator |
| 126 | Embedding and randomizing function |
| 128 | Key generator |
| 130 | Database access function |
| 132 | Embedding function |
| 134 | Randomizing function |
| 136 | Network interface |
| 138 | Database |
| 140 | Network |
| 144 | Analytic system |
| 146 | Component |
| 148 | Random number generator |
| 150 | Hash function |
| 152 | Hash function |
| 154 | Database |
| 156 | Online community |
| 158 | User profile |

What is claimed is:

1. A computer implemented method for generating a pseudonym for a user comprising:
    entering a user-selected secret and storing said user-selected secret into a memory;
    computing a private key by applying an embedding and randomizing function onto said user-selected secret;
    storing the private key in the memory;
    computing a public key using the private key, the public key and the private key forming an asymmetric cryptographic key pair;
    erasing said user-selected secret and the private key from the memory after said public key is computed; and
    outputting the public key for providing the pseudonym, wherein said pseudonym is assigned as an identity of said user and a binding between said pseudonym and said user's identity is not established by any third party.

2. The method of claim 1, the secret being selected from the group consisting of a user-selected password, a secret key, biometric data.

3. The method of claim 1, further comprising using at least one public parameter for applying the embedding and randomization function.

4. The method of claim 3, the public parameter being selected from the group consisting of a username, a user email address, a user identifier, and wherein the embedding and randomizing function is applied on the public parameter and the secret to provide a combination.

5. The method of claim 1, wherein the embedding and randomization function comprises a binary Cantor pairing function for embedding the secret.

6. The method of claim 1, the embedding and randomizing function comprising encrypting at least the embedded secret using a symmetric cryptographic algorithm by means of a symmetric key for randomizing the embedded secret.

7. The method of claim 1, the embedding and randomizing function comprising encrypting at least the secret using AES by means of a user-specific symmetric key for embedding and randomizing the secret.

8. The method of claim 1, wherein the embedding and randomizing function comprises:
    applying a first one-way function on the secret to provide a first value,
    providing a random number,
    embedding the random number and the first value by combining them to provide a combination,
    applying a second one-way function on the combination to provide a second value, wherein the second value constitutes the private key.

9. The method of claim 8, wherein the first one-way function is a first hash function, and the second one-way function is a second hash function.

10. The method of claim 8, further comprising storing the random number in a database using a public parameter assigned to the user as a database access key.

11. The method of claim 8, wherein the computation of the public key is performed by ECC cryptography.

12. The method of claim 11, further comprising providing a set of domain parameters comprising a first base point for the ECC cryptography, computing a first public key for providing a first pseudonym by the ECC cryptography using the domain parameters and the first base point, replacing the first base point by a second base point in the domain parameters, and computing a second public key by ECC cryptography using the second base point to provide a second pseudonym.

13. The method of claim 1, further comprising using the pseudonym as a database access key for storing a data object in a database.

14. The method of claim 1, further comprising storing the pseudonym in a user profile that is assigned to the user as the username.

15. A non-transitory tangible computer readable storage medium having stored therein instructions, which when executed by a computer system cause the computer system to generate a pseudonym for a user upon the user's entry of a user-selected secret by performing the steps of:
   receiving the user-selected secret and storing the user-selected secret in memory;
   computing a private key by applying an embedding and randomizing function onto the user-selected secret;
   storing the private key in the memory;
   computing a public key using the private key, the public key and the private key forming an asymmetric cryptographic key pair;
   erasing the user-selected secret and the private key from the memory after the public key is computed; and
   outputting the public key for providing the pseudonym, wherein said pseudonym is assigned as an identity of said user and a binding between said pseudonym and said user's identity is not established by any third party.

16. A computer system comprising:
   means for entering a user-selected secret and storing the user-selected secret and a private key in a memory;
   processor means being operable to:
   compute the private key by applying an embedding and randomizing function onto the user-selected secret;
   compute a public key using the private key, the public key and the private key forming an asymmetric cryptographic key pair;
   erase the user-selected secret and the private key from the memory, after the public key is computed; and
   output the public key for providing the pseudonym, wherein said pseudonym is assigned as an identity of said user and a binding between said pseudonym and said user's identity is not established by any third party.

17. The computer system of claim 16, further comprising a database and means for performing a database access operation using the pseudonym for storing a pseudonymous data object in the database.

18. The computer system of claim 17, further comprising an analytic system for analyzing the pseudomized data objects stored in the database, the analytic system comprising one of a data mining or a clustering component for performing the analysis.

19. The computer system of claim 16, the means for computing a private key by applying an embedding and randomizing function onto the secret implementing a binary cantor pairing function for embedding the secret.

20. The computer system of claim 16, wherein the means for computing a private key by applying an embedding and randomizing function onto the secret is operable to perform the steps of:
   applying a first one-way function on the secret to provide a first value,
   providing a random number,
   embedding the random number and the first value for providing a second combination,
   applying a second one-way function on the second combination to provide a second value, wherein the second value constitutes the private key.

\* \* \* \* \*